United States Patent
Sultan et al.

(10) Patent No.: US 7,363,749 B2
(45) Date of Patent: Apr. 29, 2008

(54) UPPER AUXILIARY SEAL WITH POSITIVE ATTACHMENT CONFIGURATION

(75) Inventors: Faisal Sultan, Macomb, MI (US); Munish Jain, Richmond Hill (CA); Antonio Aguiar, Oakville (CA)

(73) Assignee: Decoma International Inc., Concord, Ontario (CA)

( * ) Notice: Subject to any disclaimer, the term of this patent is extended or adjusted under 35 U.S.C. 154(b) by 414 days.

(21) Appl. No.: 10/967,925

(22) Filed: Oct. 18, 2004

(65) Prior Publication Data

US 2006/0082189 A1    Apr. 20, 2006

(51) Int. Cl.
    *E06B 7/16*       (2006.01)
(52) U.S. Cl. ............ 49/490.1; 49/495.1; 49/498.1
(58) Field of Classification Search .......... 49/475.1, 49/490.1, 495.1, 498.1
    See application file for complete search history.

(56) References Cited

U.S. PATENT DOCUMENTS

| | | | | |
|---|---|---|---|---|
| 4,653,819 A | * | 3/1987 | Swerbinsky | 312/296 |
| 5,018,308 A | * | 5/1991 | Vaughan | 49/490.1 |
| 5,207,029 A | * | 5/1993 | Nozaki et al. | 49/495.1 |
| 5,347,758 A | * | 9/1994 | Yamane | 49/484.1 |
| 5,606,828 A | * | 3/1997 | Hall et al. | 49/490.1 |
| 7,017,305 B2 | * | 3/2006 | Ikuta | 49/498.1 |
| 7,080,485 B2 | * | 7/2006 | Cittadini | 49/478.1 |

FOREIGN PATENT DOCUMENTS

| | | | | |
|---|---|---|---|---|
| JP | 2-171326 | * | 2/1990 | 49/490.1 |
| JP | 2-227322 | * | 2/1990 | 49/490.1 |

* cited by examiner

*Primary Examiner*—Jerry Redman
(74) *Attorney, Agent, or Firm*—Clark Hill PLC

(57) ABSTRACT

A seal assembly is provided for sealing a motor vehicle defining an opening having a periphery, and having a flange extending about the periphery. The seal assembly includes a base. The seal assembly also includes spaced apart locking and positioning legs extending out from the base. The positioning and locking legs define a channel therebetween for receiving the flange. A retention portion is fixedly secured to the positioning leg and extends into the channel continuously along the positioning leg to bias the flange against the locking leg such that the seal assembly is locked into engagement over the flange.

17 Claims, 3 Drawing Sheets

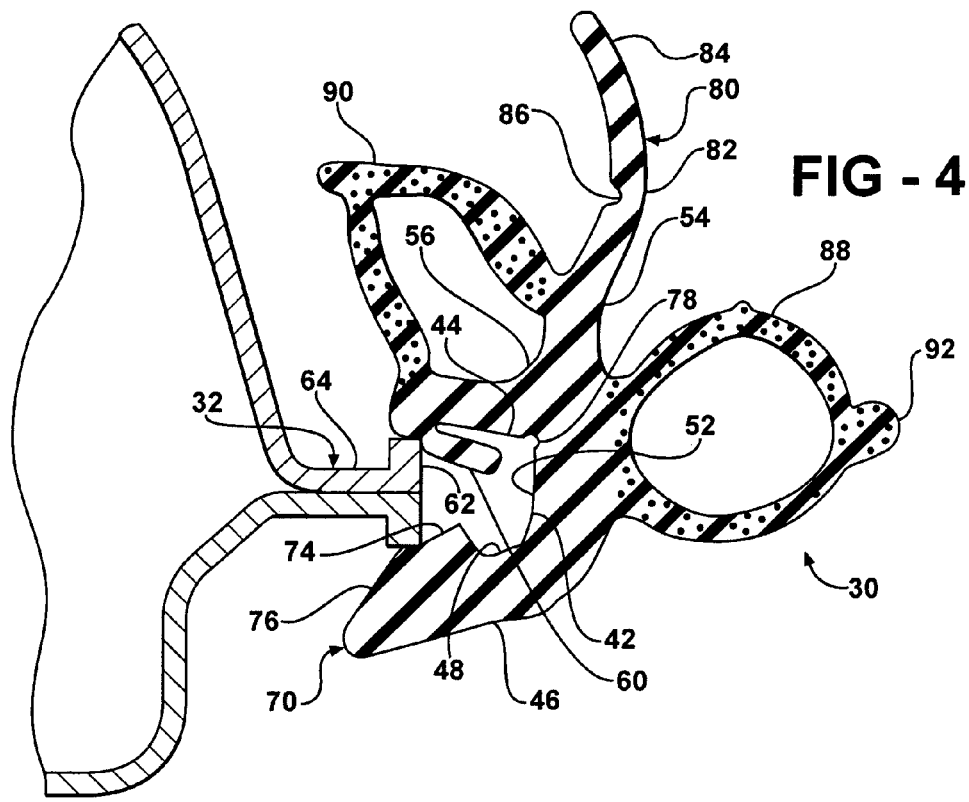
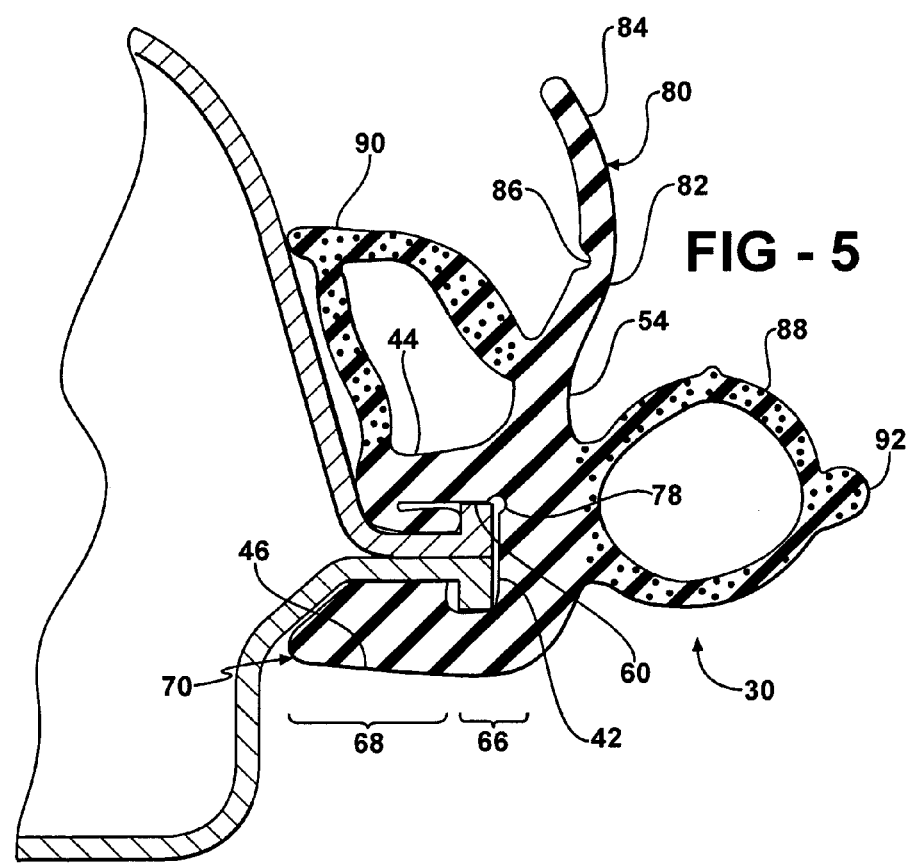

2

UPPER AUXILIARY SEAL WITH POSITIVE ATTACHMENT CONFIGURATION

FIELD OF THE INVENTION

The invention relates to a seal assembly for a motor vehicle. More particularly, this invention relates to a seal assembly that is positively engaged over a flange of a motor vehicle.

DESCRIPTION OF THE RELATED ART

Automotive door seals or weatherseals are commonly secured to either a door or body of a motor vehicle to sealingly engage the door to the body. These door seals are well-known to those skilled in the art and prevent moisture, wind, dust, and noise from entering a passenger compartment of the motor vehicle. In addition, the door seals eliminate squeaking and rattling that would otherwise result from the sheet metal-to-sheet metal contact between the door and body of the motor vehicle.

A conventional prior art sealing structure, generally indicated at 10, is shown in FIG. 1. The sealing structure 10 includes an elastomeric body portion 12 and sponge rubber sealing portions 14, 16. The body portion 12, which is typically EPDM rubber or a similar material, is reinforced by a metal carrier 18 to provide the sealing structure 10 with rigidity and stability. The body portion 12 generally includes a pair of spaced apart legs 20, 22 defining a channel 24 therebetween. The channel 24 receives a flange 26 to secure the sealing structure 10 to a motor vehicle. As the flange 26 is received further into the channel 24, a plurality of spaced apart protrusions 28 frictionally engages the flange 26 to retain the sealing structure 10 within the channel 24. The metal carrier 18 prevents the legs 20, 22 from splaying open as the flange 26 travels through the channel 24.

There are, however, disadvantages associated with the above-described sealing structure 10. First, providing the metal carrier 18, as well as the required operation for setting the metal carrier 18 in the EPDM rubber, increases the overall cost involved in making the sealing structure 10. Second, because the sealing structure 10 is only frictionally engaged to the flange 26, it is difficult for an installer to determine exactly when the flange 26 is fully inserted into the channel 24. As a result, the attachment of the sealing structure 10 to the flange 26 is oftentimes incomplete, which detracts from both the functionality of the sealing structure 10 and the appearance thereof.

SUMMARY OF THE INVENTION

According to one aspect of the invention, a seal assembly seals a motor vehicle defining an opening having a periphery and a flange extending about the periphery. The seal assembly includes a base. A locking leg extends out from the base. A positioning leg extends out from the base and is spaced apart from the locking leg. The locking and positioning legs define a channel therebetween for receiving the flange. A retention portion is fixedly secured to the positioning leg. The retention portion extends into the channel continuously along the positioning leg to bias the flange against the locking leg such that the seal assembly is locked into engagement over the flange.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a cross-sectional view of the motor vehicle including the seal assembly partially secured over the flange;

FIG. 5 is a cross-sectional view of the motor vehicle taken along lines 5-5 of FIG. 2 depicting the seal assembly in positive, locking engagement with the flange.

DETAILED DESCRIPTION OF THE PREFERRED EMBODIMENT

Figure 1:
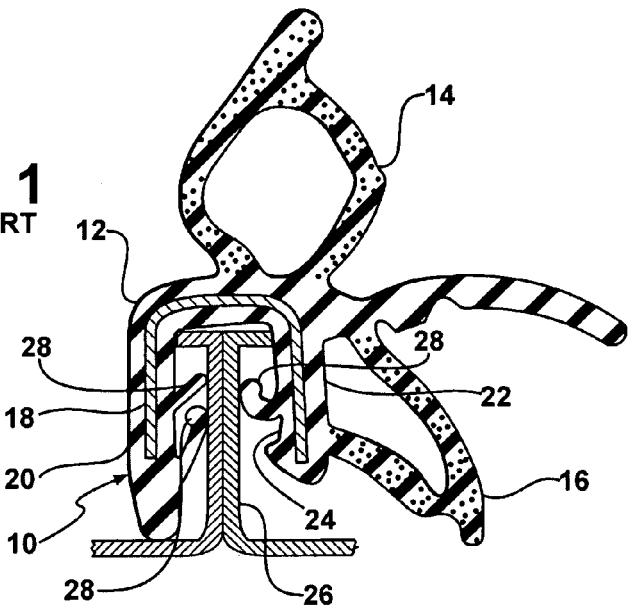
FIG. 1 is a cross-sectional view of a prior art sealing structure secured to a flange of a motor vehicle.
Figure 2:
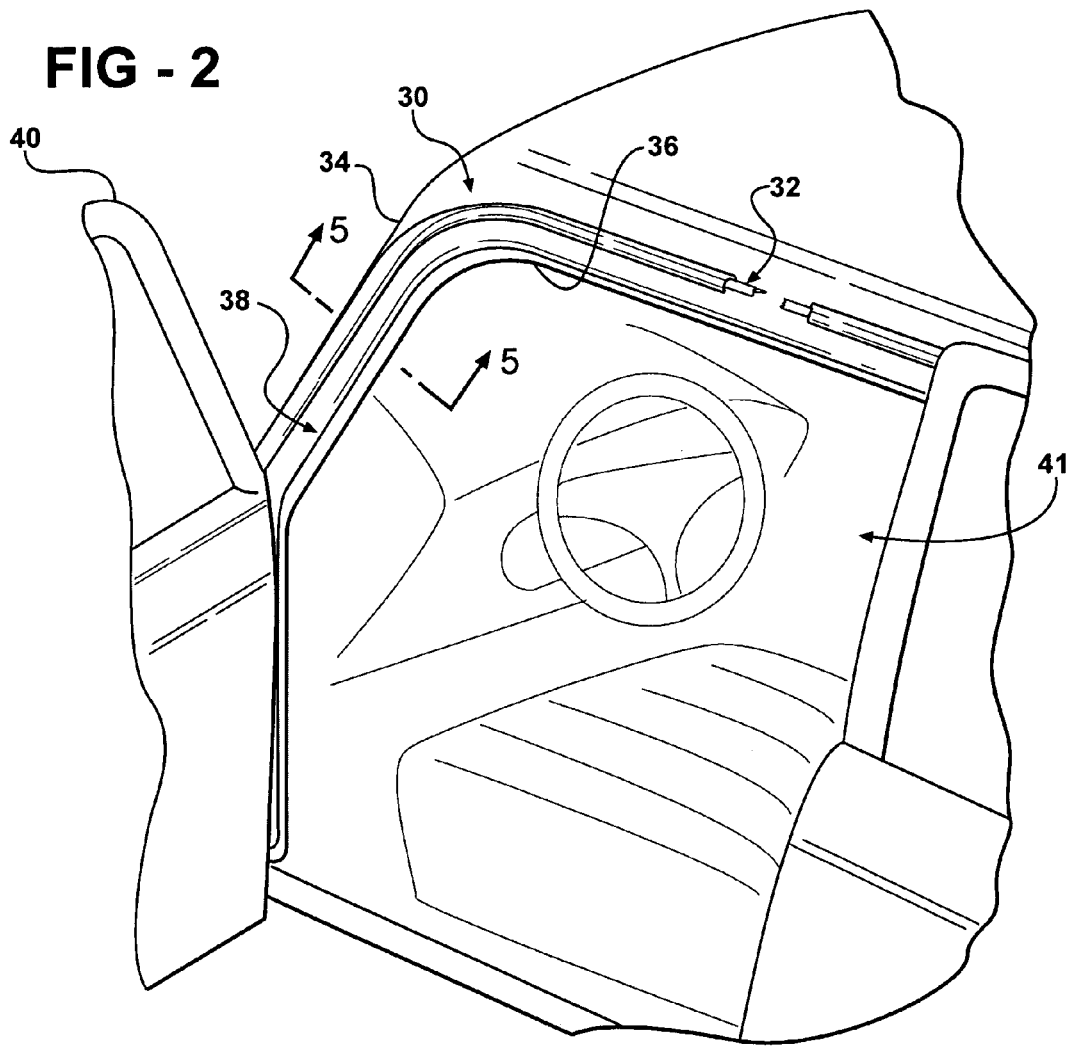
FIG. 2 is a fragmentary, perspective view of a motor vehicle and a seal assembly according to the invention secured thereto.

A conventional prior art sealing structure 10 has been described above and is shown in FIG. 1. A seal assembly, generally shown at 30, according to the invention is shown in FIGS. 2 through 6. Referring to FIG. 2, the seal assembly 30 is secured to a flange, generally indicated at 32, of a motor vehicle 34. The motor vehicle 34 defines an opening 36 having a periphery 38. The flange 32 extends about the periphery 38 of the opening 36. The opening 36 is selectively closed by a door 40.

The seal assembly 30 is elongated and extends along the periphery 38 of the opening 36 to provide sealing engagement between the flange 32 and the door 40. The seal assembly 30 prevents water, wind, dust, and noise from entering a passenger compartment 41 of the motor vehicle 34 when the door 40 is closed thereagainst.

Figure 3:
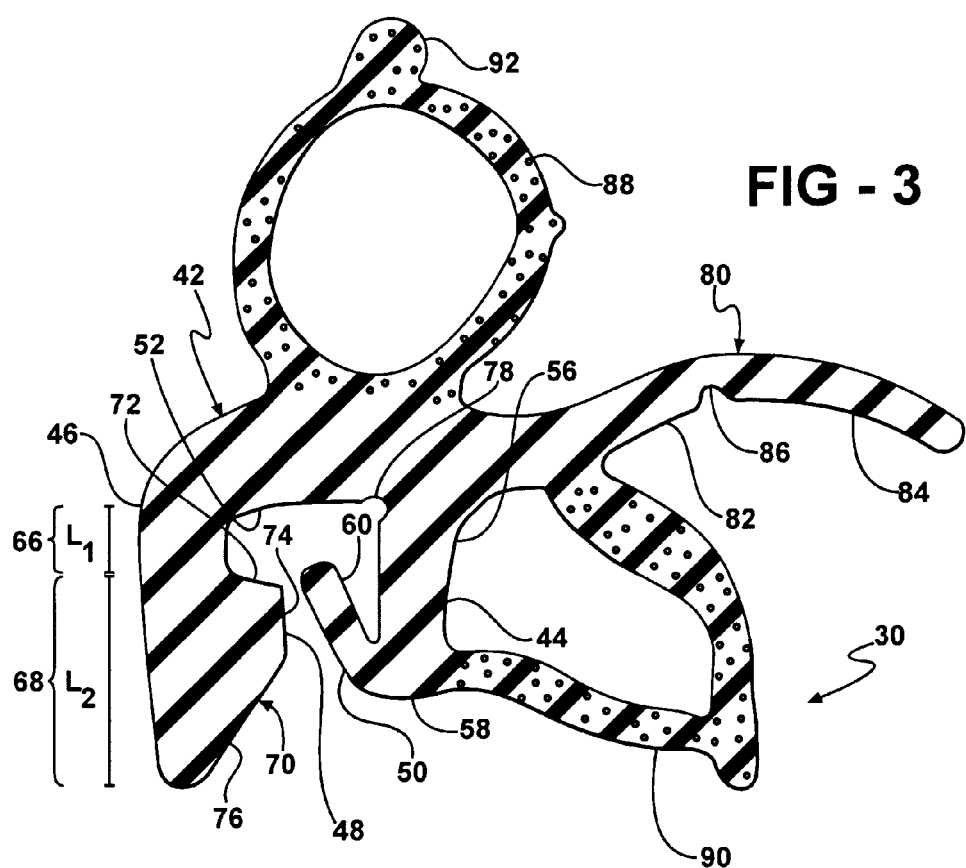
FIG. 3 is a cross-sectional view of the seal assembly.

Referring to FIG. 3, the seal assembly 30 includes a base, generally indicated at 42, and spaced apart locking 44 and positioning 46 legs extending out from the base 42. The locking 44 and positioning 46 legs define a channel 48 therebetween for receiving the flange 32. The channel 48 extends between opposing open 50 and closed 52 ends.

The locking leg 44 extends between a first end 56 and an opposing second end 58. A locking mechanism 60 extends out from the second end 58 of the locking leg 44 and is disposed within the channel 48. In a preferred embodiment, the locking mechanism 60 is a lock tab. It is, however, appreciated that the locking mechanism 60 may take the form of any of numerous configurations. The lock tab 60 is resiliently coupled to the second end 58 of the locking leg 44.

Referring to FIG. 4, the flange 32 includes a leading portion 62, which outwardly displaces the lock tab 60 as the flange 32 moves from the open end 50 of the channel 48 to the closed end 52 thereof, and a central portion 64 perpendicular to the leading portion 62. After the leading portion 62 passes the lock tab 60, the lock tab 60 snap fits into place against the central portion 64 to lockingly engage the flange 32 at the closed end 52 of the channel 48. Thus, the seal assembly 30 is secured along the flange 32 by a positive, mechanical attachment.

Referring back to FIG. 3, the positioning leg 46 includes a first segment 66 having a length $L_1$, and a second segment 68 having a length $L_2$. The length $L_2$ of the second segment 68 is greater than the length $L_1$ of the first segment 66. A retention portion, generally indicated at 70, is fixedly secured to the second segment 68 of the positioning leg 46. The retention portion 70 may extend continuously along the entire length $L_2$ of the second segment 68 of the positioning leg 46 into the channel 48 to bias the locking leg 44 into locking engagement with the flange 32 to retain the seal assembly 30 thereover. In addition, the retention portion 70 is a bulkened structure that bears upon the flange 32 when the flange 32 is locked into place at the closed end 52 of the channel 48 of the seal assembly 30.

Figure 6:
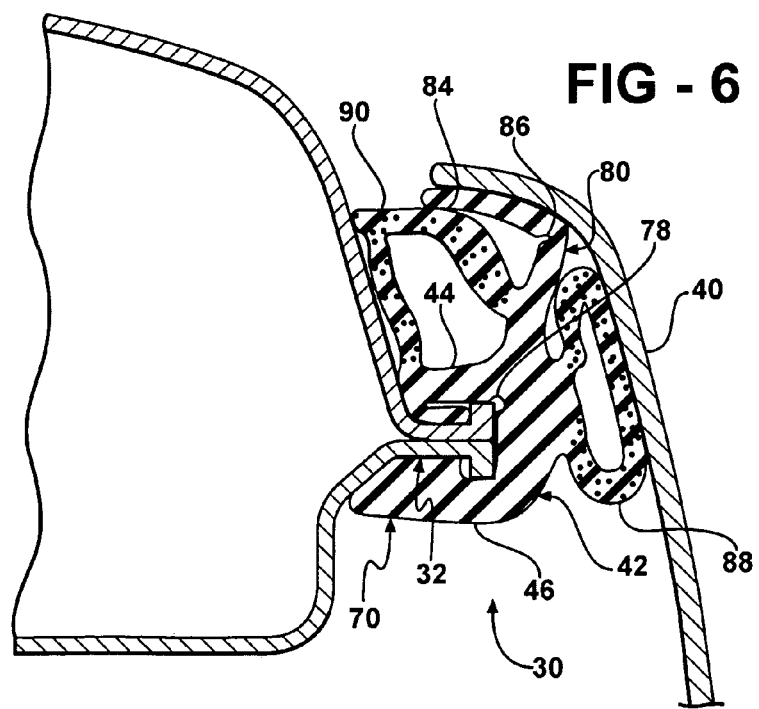
FIG. 6 is a cross-sectional view similar to FIG. 5 including a door closed against the seal assembly.

The retention portion 70 includes an inner surface 72, an engagement surface 74, and a ramped surface 76. The engagement surface 74 abuttingly and complementarily engages the central portion 64 of the flange 32 when the flange 32 is lockingly engaged by the lock tab 60, as shown in FIG. 6. The ramped surface 76 provides an installer with a reference surface for aligning the channel 48 of the seal assembly 30 over the flange 32. Upon such alignment, the ramped surface 76 guides the flange 32 into the open end 50 of the channel 48.

The seal assembly 30 further includes a living hinge 78 fixedly secured to the base 42 adjacent the locking leg 44. The living hinge 78 abuts against the locking leg 44. The living hinge 78 allows for selective pivotal movement of the positioning leg 46 relative to the locking leg 44. More specifically, the positioning leg 46 pivots about the living hinge 78 to widen the channel 48 for allowing movement of the flange 32 from the open end 50 of the channel 48 to the closed end 52 thereof, as shown in FIG. 4. When the flange 32 reaches the closed end 52 of the channel 48, the positioning leg 46 pivots about the living hinge 78 to return to a normal position, shown in FIG. 3. Thus, the living hinge 78 provides for simple installation of the seal assembly 30 along the flange 32.

The base 42 of the seal assembly 30 is formed from EPDM, TPV, or a similar material. In the preferred embodiment, the base 42 is formed from EPDM rubber having a durometer between approximately 75-100 Shore A. Within this approximate durometer range, the rigidity of the positioning leg 46 ensures that the positioning leg 46 will return to the normal position after it pivots about the living hinge 78 to allow the flange 32 to move from the open end 50 of the channel 48 to the closed end 52 thereof. In the most preferred embodiment, the base 42 is formed from EPDM rubber having a durometer between 75-85 Shore A.

The seal assembly 30 also includes a closeout lip, generally indicated at 80, extending out from the base 42. The closeout lip 80 includes a proximal segment 82 and a distal, flexible segment 84 separated by a lip hinge 86. The distal, flexible segment 84 pivots about the lip hinge 86 relative to the proximal segment 82 when the door 40 is closed, as shown in FIG. 6, to form a water management dam for stopping moisture from entering the passenger compartment 41.

The seal assembly 30 further includes a circular sealing bulb 88 extending out from the base 42, and a shark fin sealing bulb 90 extending between the locking leg 44 and the closeout lip 80. The circular sealing bulb 88 includes a flame tip 92 that is compressed by the door 40, as shown in FIG. 6, when the door 40 is closed to provide sealing engagement between the door 40 and the rest of the motor vehicle 32. The shark fin sealing bulb 90 is compressed by the distal segment 84 of the closeout lip 80 when the door 40 is closed. Both the circular 88 and shark fin 90 sealing bulbs are preferably formed from a sponge rubber material, as is well-known to those skilled in the art.

To secure the seal assembly 30 to the motor vehicle 34, the seal assembly 30 is first positioned over the flange 32 and the channel 48 is aligned thereto by the ramped surface 76. The ramped surface 76 also guides the flange 32 into the open end 50 of the channel 48. As the flange 32 enters the open end 50 of the channel 48, the leading portion 62 of the flange 32 causes the positioning leg 46 to pivot about the living hinge 78. This widens the channel 48, which facilitates movement of the flange 32 towards the closed end 52 of the channel 48. The leading portion 62 also outwardly displaces the lock tab 60 as the flange 32 moves to the closed end 52 of the channel 48. When the leading portion 62 completely passes the lock tab 60, the lock tab 60 snaps into positive, locking engagement with the flange 32 at the closed end 52 of the channel 48. At the same time, the positioning leg 46 returns to the normal position, in which the engagement surface 74 abuttingly and complementarily engages the central portion 64 of the flange 32. The retention portion 70 biases the flange 32 into locking engagement with the lock tab 60 to strengthen the engagement of the seal assembly 30 over the flange 32. As a result, a significant extraction force must be exerted upon the seal assembly 30 to pull the seal assembly 30 off of the flange 32. The seal assembly 30 may be repeatedly installed along the flange 32 and removed therefrom without being permanently distorted.

The absence of a metal carrier results in a cost-effective, lightweight seal assembly 30 that can be completely recycled after use as raw materials for other products. Also, without the metal carrier, the seal assembly 30 does not have exposed metal ends that will oxide or require anti-corrosion additives.

Finally, it is appreciated that although the seal assembly 30 has been described as being secured to the flange 32 of the motor vehicle 34, the seal assembly 30 may, in the alternative, be secured to the door 40.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A seal assembly for sealing a motor vehicle defining an opening having a periphery and a flange extending about the periphery, said seal assembly comprising:
 a base;
 a locking leg extending out from said base;
 a positioning leg extending out from said base and spaced apart from said locking leg, said positioning and locking legs defining a channel therebetween for receiving the flange, said channel extending between open and closed ends; and
 a retention portion fixedly secured to said positioning leg and extending into said channel continuously along said positioning leg to bias the flange against said locking leg such that said seal assembly is locked into engagement over the flange, said retention portion including an engagement portion abuttingly and complementarily engaging the flange within said channel, said retention portion also including a ramped surface extending out from said engagement surface and disposed at said open end of said channel for guiding the flange into said open end of said channel.

2. A seal assembly as set forth in claim 1 wherein said positioning leg includes a first segment defining a length and a second segment defining a length.

3. A seal assembly as set forth in claim 2 wherein said length of said second segment is greater than said length of said first segment.

4. A seal assembly as set forth in claim 3 wherein said retention portion extends along a majority of said second segment.

5. A seal assembly as set forth in claim 4 including a closeout lip extending out from said base for concealing a portion of the motor vehicle adjacent to the flange.

6. A seal assembly as set forth in claim 5 wherein said closeout lip includes a lip hinge for selectively pivoting a portion of said closeout lip relative to a remaining portion of said closeout lip to prevent moisture from entering the motor vehicle.

7. A seal assembly as set forth in claim 6 including a circular bulb sealing portion extending out from said base for sealing the opening when the opening is closed.

8. A seal assembly as set forth in claim 7 including a shark fin bulb sealing portion extending between said base and said closeout lip for sealingly engaging said closeout lip when the opening is closed.

9. A seal assembly as set forth in claim 8 wherein said base includes a living hinge fixedly secured thereto for selectively pivoting said positioning leg relative said locking leg to receive the flange within said channel.

10. A seal assembly as set forth in claim 9 wherein said locking leg includes a lock mechanism resiliently coupled thereto for lockingly engaging the flange within said channel.

11. A seal assembly for sealing a motor vehicle defining an opening having a periphery and a flange, having a leading edge and a central portion, extending about the periphery, said seal assembly comprising:
   a base;
   a locking leg extending out from said base and including a lock tab;
   a positioning leg extending out from said base and spaced apart from said locking leg, said locking and positioning legs defining a channel therebetween having opposing open and closed ends, said positioning leg including a retention portion fixedly secured thereto and extending into said channel continuously along said positioning leg; and
   a living hinge fixedly secured to said base and abutting against said locking leg for selectively pivoting said positioning leg relative to said locking leg to allow the flange to move past said open end of said channel and into locking engagement with said locking leg at said closed end of said channel;
   whereby said lock tab is secured to said locking leg at said open end of said channel and is displaced into locking engagement with the central portion of the flange by movement of the leading edge of the flange from said open end of said channel to said closed end thereof, said retention portion biasing the central portion against the lock tab to strengthen the locking engagement of said seal assembly over the flange.

12. A seal assembly as set forth in claim 11 wherein said retention portion includes an engagement surface for abuttingly and complementarily engaging a portion of the flange.

13. A seal assembly as set forth in claim 12 wherein said retention portion includes a ramped surface for guiding the flange into said open end of said channel.

14. A seal assembly for sealing an opening of a motor vehicle body having a flange including a leading edge and a central portion, said seal assembly comprising:
   a base;
   a locking leg extending out from said base and including a lock mechanism secured thereto for positively engaging the flange;
   a positioning leg extending out from said base for aligning said seal assembly along the flange, said positioning and locking legs defining a channel therebetween having opposing open and closed ends; and
   a living hinge fixedly secured to said base and abutting against said locking leg for selectively pivoting said positioning leg relative to said locking leg to allow the flange to move past said open end of said channel and into locking engagement with said lock mechanism at said closed end of said channel;
   said lock mechanism connected to said locking leg at said open end of said channel and displaced relative to said locking leg as the leading edge of the flange moves towards said closed end of said channel, said lock mechanism locking into engagement with the central portion of the flange when the leading edge reaches said closed end of said channel to create a positive, mechanical attachment between said seal assembly and the flange.

15. A seal assembly as set forth in claim 14 including a retention portion fixedly secured to said positioning leg and extending into said channel continuously along said positioning leg to bias the flange against said locking leg such that said seal assembly is locked into engagement over the flange.

16. A seal assembly as set forth in claim 15 wherein said retention portion includes an engagement surface for abuttingly and complementarily engaging a portion of the flange.

17. A seal assembly as set forth in claim 16 wherein said retention portion includes a ramped surface for guiding the flange into said open end of said channel.

* * * * *